(12) United States Patent
Glejbol

(10) Patent No.: US 11,187,359 B2
(45) Date of Patent: Nov. 30, 2021

(54) ASSEMBLY COMPRISING AN END-FITTING FOR TERMINATING AN UNBONDED FLEXIBLE PIPE AND AN UNBONDED FLEXIBLE PIPE

(71) Applicant: National Oilwell Varco Denmark I/S, Brondby (DK)

(72) Inventor: Kristian Glejbol, Glostrup (DK)

(73) Assignee: National Oilwell Varco Denmark I/S, Brondby (DK)

(*) Notice: Subject to any disclaimer, the term of this patent is extended or adjusted under 35 U.S.C. 154(b) by 604 days.

(21) Appl. No.: 16/077,225

(22) PCT Filed: Feb. 15, 2017

(86) PCT No.: PCT/DK2017/050041
§ 371 (c)(1),
(2) Date: Aug. 10, 2018

(87) PCT Pub. No.: WO2017/140321
PCT Pub. Date: Aug. 24, 2017

(65) Prior Publication Data
US 2019/0024830 A1    Jan. 24, 2019

(30) Foreign Application Priority Data
Feb. 15, 2016 (DK) .......................... PA 2016 70081

(51) Int. Cl.
*F16L 25/01*    (2006.01)
*F16L 33/01*    (2006.01)
(Continued)

(52) U.S. Cl.
CPC ............. *F16L 25/01* (2013.01); *F16L 11/127* (2013.01); *F16L 33/01* (2013.01); *F16L 33/28* (2013.01); *F16L 53/30* (2018.01)

(58) Field of Classification Search
CPC ......... F16L 33/28; F16L 25/01; F16L 11/127; F16L 33/01; F16L 53/30
(Continued)

(56) References Cited

U.S. PATENT DOCUMENTS 3,818,116 A * 6/1974 Kuljian ................ H01B 7/0072
174/15.6
6,412,825 B1   7/2002 Langkjaer
(Continued)

FOREIGN PATENT DOCUMENTS

EP    0485220 A1 *  5/1992 ............ F16L 11/127
EP     485220 A1    5/1992
(Continued)

OTHER PUBLICATIONS

Danish Search Report for Application No. PA 2016 70081, dated Sep. 8, 2016.
(Continued)

*Primary Examiner* — Dana Ross
*Assistant Examiner* — Kuangyue Chen
(74) *Attorney, Agent, or Firm* — Pearne & Gordon LLP

(57) ABSTRACT

The present invention relates to an assembly including an end-fitting for terminating an unbonded flexible pipe and an unbonded flexible pipe. The unbonded flexible pipe includes a first and a second armour layer co-axially arranged, and an electric heating system. The end-fitting includes means for mechanically anchoring the first armour layer to the end-fitting and includes electrical connections for connecting the first armour layer to a power-source. The end-fitting also includes means for mechanically anchoring the second armour layer to the end-fitting. The first and the second armour layers are electrically insulated from each other by at least one electrically insulating layer in the end-fitting and the end-fitting includes a local volume in the end-fitting
(Continued)

adjacent to the electrically insulating layer adapted for injection of a functional fluid.

18 Claims, 3 Drawing Sheets

(51) Int. Cl.
  *F16L 33/28* (2006.01)
  *F16L 11/127* (2006.01)
  *F16L 53/30* (2018.01)

(58) Field of Classification Search
  USPC .......................................................... 219/643
  See application file for complete search history.

(56) References Cited

U.S. PATENT DOCUMENTS

| | | | |
|---|---|---|---|
| 2003/0181863 A1* | 9/2003 | Ackley | A61M 37/0015 604/201 |
| 2011/0229271 A1 | 9/2011 | Clements | |
| 2015/0059909 A1 | 3/2015 | Castel et al. | |
| 2016/0178106 A1* | 6/2016 | Glejbol | F16L 11/081 138/130 |
| 2017/0299092 A1 | 10/2017 | Larsen et al. | |
| 2017/0341149 A1* | 11/2017 | Clements | B22F 10/00 |
| 2018/0231163 A1 | 8/2018 | Holst et al. | |

FOREIGN PATENT DOCUMENTS

| | | |
|---|---|---|
| FR | 3006032 A1 | 11/2014 |
| WO | 99/19656 A1 | 4/1999 |
| WO | 2015/000923 A1 | 1/2015 |
| WO | 2015/014365 A1 | 2/2015 |
| WO | 2015/027304 A1 | 3/2015 |
| WO | 2018/149461 A1 | 8/2018 |
| WO | 2018/149462 A1 | 8/2018 |

OTHER PUBLICATIONS

"Recommended Practice for Flexible Pipe", ANSI/API 17 B, fourth Edition, Jul. 2008.
"Specification for Unbonded Flexible Pipe", ANSI/API 17J, Third edition, Jul. 2008.
International Search Report for International Application No. PCT/DK2017/050041, dated Mar. 28, 2017.

* cited by examiner

ASSEMBLY COMPRISING AN END-FITTING FOR TERMINATING AN UNBONDED FLEXIBLE PIPE AND AN UNBONDED FLEXIBLE PIPE

The present invention relates to an end-fitting for terminating an unbonded flexible pipe and an unbonded flexible pipe terminated in the end-fitting, where the end-fitting comprises means for establishing an electrical connection to a least one electrical conductor.

TECHNICAL FIELD

Unbonded flexible pipes terminated by end-fittings are used for transport of hydrocarbons such as oil and gas, and in particular the end-fittings and the unbonded flexible pipes are used for off-shore transport of oil and gases. The unbonded flexible pipe e.g. conveys the hydrocarbons from a subsea installation to a vessel floating on the sea surface. The unbonded flexible pipe is terminated at each end in an end-fitting which connects the unbonded flexible pipe to the subsea installation and the vessel, respectively.

End-fittings and unbonded flexible pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. The unbonded flexible pipes usually comprise an internal pressure sheath—often referred to as an innermost sealing sheath or inner liner, which forms a barrier against the outflow of the fluid which is conveyed in the bore of the pipe, and one or usually a plurality of armour layers. Normally, the pipe further comprises an outer protection layer, often referred to as the outer sheath, which provides mechanical protection of the armour layers. The outer protection layer may be a sealing layer sealing against ingress of sea water. In certain unbonded flexible pipes, one or more intermediate sealing layers are arranged between armor layers. The different layers are terminated in the end-fitting, meaning that the layers are fastened and locked in the end-fitting by use of e.g. mechanical means, welding, or potting using e.g. a filled epoxy resin. Thus, the end-fitting forms a mechanical interface between the unbonded flexible pipe and a connection on the vessel or the subsea installation.

In practice, the known pipe normally comprises at least two armour layers located outside the internal pressure sheath and an armour structure located inside the internal pressure sheath, which inner armour structure normally is referred to as the carcass. These armour layers are terminated in the end-fitting, which is normally made from a metal alloy. The carcass is normally terminated by a ring comprising a screw lock which is mechanical locked to the end-fitting. The armour layers outside the internal pressure sheath are usually terminated in cavities in the end-fitting and locked by use of e.g. epoxy resin. The armour layers on the outer side of the internal pressure sheath are normally constituted by a pressure armour layer and a tensile armour layer comprising two counter-wound sub layers. The outer sheath may be terminated and attached to the end-fitting by mechanical means. One problem which frequently arises when the unbonded flexible pipe is used offshore for transport of fluids of hydrocarbons is that the fluid is cooled by the surrounding sea water so the fluid becomes highly viscous and difficult to transport. In some situations, the bore of the pipe may even be blocked by solidified hydrocarbons or hydrates. This problem is normally addressed by applying thermal insulation layers to the pipe structure or by active heating, such as electric heating Both the solution of applying thermal insulation layers and the solution of using electric heating function quite well. However, due to the high flexibility of electric heating this solution tends to become more and more widespread for use in unbonded flexible pipes.

The electric heating is realized by electric conductors running along the length of the pipe and sending a current through these. In a recent developed method for electric heating of unbonded flexible pipes, it has been found that one or more of the metallic armour layers of the pipe may be used as conductors enabling heating, by passing a current through the armour layer.

Normally, the electric connections between the electric power source providing the electric power for heating and the heating element will be established in the end-fitting. To heat the pipes, typically a current of several hundred Amperes is needed. As the unbonded flexible pipes may have a length of several hundred meters or more, the voltage needed to drive the required current through the pipes is typically in the order of several thousand volts.

The international patent application PCT/DK2014/050109 discloses an offshore system comprising an unbonded flexible pipe terminated by end-fittings at each end. The offshore system includes an electrical heating system utilizing the carcass and the armour layers in the unbonded flexible pipe as electrical conductors. To avoid unintended current paths, the through-going opening in the end-fitting is electrically insulated, e.g. by an extension of the internal pressure sheath of the unbonded flexible pipe or by application of a layer insulating material, such as rubber. When unbonded flexible pipes comprise electrical heating systems, electric wiring is required to establish electrical contact between a power source and the electrical heating system. The electric wiring in the end-fitting and the connections to the heating means, i.e. the wires or armour layer in the pipe, are well insulated, e.g. by means of electrical insulating seals and gaskets. The layers of the polymer material in the unbonded flexible pipe, i.e. the internal pressure sheath, the outer sheath and optionally thermal insulating layers may also function as electrical insulating layers. However, in operation it has been found that leak currents may occur. Leak current refers to non-intended electricity flow via structures or surfaces. The occurrence of leak currents is highly undesirable as they may cause local heating as well as sparks and silent discharges, which over time destroys the electrical insulation properties of the system, ultimately leading to system failure.

DISCLOSURE OF INVENTION

An object of the present invention is to obtain an end-fitting to be connected with and terminating an unbonded flexible pipe which comprises an electric heating system, where the end-fitting has improved properties in respect of suppressing leak currents.

The present invention relates to an end-fitting for terminating an unbonded flexible pipe and an unbonded flexible pipe terminated in the end-fitting. The unbonded flexible pipe comprises a first and a second armour layer co-axially arranged, and an electric heating system, said end-fitting comprises means for mechanically anchoring the first armour layer to the end-fitting and comprises electrical connections for connecting the first armour layer to a power-source, said end-fitting comprises means for mechanically anchoring the second armour layer to the end-fitting, the first and the second armour layers being electrically insulated from each other by at least one electrically insulating layer in the end-fitting, wherein a local volume in the end-fitting adjacent to the electrically insulating layer is adapted for injection of a functional fluid.

The end-fitting according to the invention is conveniently adapted for terminating an unbonded flexible pipe comprising an electric heating system. The unbonded flexible pipe is terminated in the end-fitting in such a way that the individual layers of the unbonded flexible pipe are terminated separately in the end-fitting. The armour layers are typically terminated either mechanically by means of bolts, by welding or by potting or the like, hence anchoring the layers to the end-fitting. Polymer layers, like the internal pressure sheath, are typically terminated by means of gaskets or the like, which squeezes on the layers to keep them in place.

The electrically insulating layer between the first and the second armour layer on the pipe preferably has an electrically resistivity of at least $10^7 \Omega \cdot m$. More preferred an electrically resistivity of at least $10^8 \Omega \cdot m$, such as an electrically resistivity of at least $10^9 \Omega \cdot m$, conveniently an electrically resistivity of at least $10^{10} \Omega \cdot m$.

The end-fitting comprises a through-going opening extending in the longitudinally axial direction from the front end to the back end of the end-fitting. The unbonded flexible pipe enters the end-fitting at the front end and is terminated along the length of the end-fitting. In operation the through-going opening of the end-fitting is connected with the bore of the unbonded flexible pipe, so the through-going opening may be seen as acting as an extension of the bore, and fluid conveyed in the bore passes through the through-going opening from the bore to a connector. The connector provides a leak-tight structural connection between the back end of the end-fitting and adjacent piping.

The through-going opening can be seen as a substantially cylindrical shaped passageway through the end-fitting. However, in reality the through-going opening comprises parts with recesses, necks, and indentations for terminating the unbonded flexible pipe. In this context, all these parts are included in the term "through-going opening". However, when the unbonded flexible pipe is terminated in the end-fitting, the through-going opening of the end-fitting and the bore of the unbonded pipe form a substantial cylindrical shaped passageway through the end-fitting.

The term "substantially" should herein be taken to mean that ordinary product variances and tolerances are comprised.

The unbonded flexible pipe comprises two ends and both ends may be terminated in an end-fitting according to the invention. Alternatively, the one end of the unbonded flexible pipe is terminated in an end-fitting according to the invention and the other end is terminated in e.g. a connector or an end-fitting which is not according to the invention.

Termination of the pipe in the end-fitting means that the layers of the pipe each are attached to the end-fitting by conventional and well-known techniques, e.g. as described in "Recommended Practice for Flexible Pipe"; ANSI/API Recommended Practice 17B; Fourth edition, July 2008. In this manner, a fluid-tight transition between the pipe and other parts in a fluid transport system is achieved.

As mentioned, the unbonded flexible pipe enters the end-fitting at the front end and is terminated in the end-fitting by use of well-known methods. When the unbonded flexible pipe is terminated in the end-fitting, the centerline of the end-fitting may be construed as an extension of the axis of the pipe. The rear end of the end-fitting comprises means for connecting the end-fitting to the connector. The end-fitting comprises metallic parts and these parts are in a conventional end-fitting mainly the inner casing and the outer casing (using the nomenclature of "Recommended Practice for Flexible Pipe", ANSI/API 17 B, Fourth Edition, July 2008). Moreover, the end-fitting may comprise other metallic parts, such as e.g. ring-shaped members serving to fix layers of the unbonded flexible pipe in the end-fitting. Although alternative materials are available for the manufacture of end-fittings e.g. polymer materials, metallic materials are, however, still preferred due to the mechanical properties, workability, and cost.

Thus, the end-fitting is preferably made from metallic material, such as carbon steel. As the end-fitting generally is made from a carbon steel which may conduct an electric current, this metallic alloy is also sensitive to differences in electric potentials, and, thus, sensitive to galvanic corrosion. Consequently, the leakage currents may cause galvanic corrosion. Moreover, leakage currents may deteriorate the electrical insulation of the system.

As the end-fitting is adapted for unbonded flexible pipes with electric heating systems, the end-fitting comprises electric wiring, contacts, and other means necessary for establishing electrical contact between a power source and electrical conductors in the unbonded flexible pipes. Moreover, the parts in the end-fitting which are intended to conduct electric power need to be insulated from the parts of the end-fitting which are not intended to conduct electric power. Thus, electrical insulating material is fitted between the electrical conductive parts and the parts intended to be non-conductive. Moreover, further electrical insulation may be required between different electrical conductive parts to avoid short circuit.

The end-fitting according to the invention is adapted with electric wiring for establishing electrical contact between an electric power source and an electric heating system in the unbonded flexible pipe. The wiring may be copper wires or rods which are led through one or more passageways in the end-fitting to connection points on the electric heating element. The wiring may also be aluminium. Although the wires and connection points are regulatory insulated, it has, however, been found that leaking currents may appear in the end-fitting. The leaking currents may be very weak, but they may still be able to deteriorate the electrical properties of the system and should thus be prevented.

Accordingly, the end-fitting comprises electrical connections for connecting the first armour layer to a power-source, and furthermore comprises electrical connections for connecting the second armour layer to either the same power-source as the first armour layer is connected to, or another power-source or ground. Thus, it is possible to establish an electrical flow path through the first and the second armour layer.

A local volume is provided in the end-fitting and serves to provide a volume in the end-fitting with desired properties which will be determined by the functional fluid such as e.g. electric insulating properties if the functional fluid is an electric insulating fluid.

For the purpose of obtaining a connection between the local volume and the external environment, the local volume communicates with the exterior surface of the end-fitting via at least one channel. The channel or channels may be used for supplying the functional fluid to the local volume and/or venting the local volume.

The functional fluid may be a fluid which satisfies a number of demands and is intended to have a function in the local volume, such as e.g. an insulating function or a moisture absorbing function.

In an embodiment, the functional fluid is a liquid.

In an embodiment, the functional fluid is a gas.

In an embodiment, the functional fluid is an electrically insulating fluid. The insulating function of the fluid may serve to inhibit unintended current paths in the end-fitting.

In an embodiment, the functional fluid is a moisture absorbing fluid. Moisture may serve as a path for leakage current, and when the fluid absorbs the moisture in the local volume, the path is cut off.

In an embodiment, the functional fluid is transformer oil. Transformer oil typically has excellent insulating properties.

In an embodiment, the functional fluid is arc suppressing. When the functional fluid is arc suppressing, it may also serve to suppress the formation of sparks due to leakage current.

In an embodiment, the functional fluid is $SF_6$ (sulfurhexaflouride) or a halogenated gas such as Freon 12. $SF_6$ and Freon 12 are highly effective as electrical insulating gases. Moreover, gasses are in particular suited for flushing moisture out of the internal volume of the end-fitting.

The first armour layer and the second armour layer are made from electrically conductive material such as carbon steel or stainless steel, aluminum or titanium. The carcass is normally arranged in the bore of the pipe and in physical contact with the fluid to be transported. Thus, it is convenient to use the carcass as a heating element and in an embodiment the first armour layer is a carcass. The carcass is terminated mechanically with a carcass ring in the innermost part of the end-fitting.

Most unbonded flexible pipes comprise a pressure armour outside the internal pressure sheath. The pressure armour is very often made from metallic material and electric conductive. Such metallic pressure armour may be used for conducting electric current and in an embodiment the second armour layer is a pressure armour. The pressure armour is preferably terminated by means of bolts in the end-fitting.

Unbonded flexible pipes may also comprise one or more tensile armour layers located outside the internal pressure sheath. This one or more tensile armour layers are frequently manufactured from metal. In an embodiment, the second armour layer is a tensile armour. Thus, if the unbonded flexible pipe does e.g. not comprise pressure armour, the tensile armour may be used as electrical conductor. The tensile armour is terminated in the end-fitting in a fixation chamber, which e.g. is a chamber provided between an inner casing and an outer casing of the end-fitting. In the fixation chamber, the tensile armour is e.g. fixed by means of a resin, such as epoxy. The fixation chamber is distinct from the local volume which is adapted to receive a functional fluid. The local volume may appear adjacent to the fixation chamber or at a distance from the fixation chamber.

Often the tensile armour and the pressure armour are in electrically coupled. In this case, current will run in both the pressure armour and the tensile armour.

In an embodiment, the first and the second armour layer are separated by an internal pressure sheath. In this embodiment, the internal pressure sheath serves as the electrically insulating layer, and an electrical flow path may be formed by the first and the second armour layer on each side of the internal pressure sheath. Preferably, the first armour layer is a carcass and the second armour layer is a pressure armour or optionally a tensile armour.

An unbonded flexible pipe always comprises an internal pressure sheath and, consequently, the end-fitting comprises means for terminating the internal pressure sheath. The means for terminating the pressure sheath may be squeezing means such as in traditional end-fittings not intended for terminating flexible pipes with electrical heating.

In an embodiment, the carcass serves as the heating element. The first end of the unbonded flexible pipe is terminated in a first end-fitting according to the invention and the carcass is connected with electric wiring from a power source, e.g. at the carcass ring. At the second end, the unbonded flexible pipe is terminated in a second end-fitting according to the invention, and the carcass is electrical connected with the tensile armour in the pipe via electric wiring in the second end-fitting. In the first end-fitting, the tensile armour is connected to the power source via wiring in the end-fitting. Thus, an electrical circuit is established between the first and the second end-fitting by means of wiring in the two end-fittings and the carcass and the tensile armour in the unbonded flexible pipe. There will be at least one insulating layer between the carcass and the pressure armour in the pipe, namely the internal pressure sheath. Optionally, one or more thermal insulating layers which will also function as electrically insulating layers may be placed between the carcass and the pressure armour. Electrically insulating layers may also be located between the pressure armour and the tensile armour. The electrical circuit is adjusted so the carcass will function as a heating element. By use of an end-fitting according to the invention, undesired leakage or stray currents and optionally short cuts may be avoided.

The local volume in the end-fitting serves to inhibit non-intended currents and spark formation, and advantageously the local volume is filled with a functional fluid which inhibits or prevents this. The local volume is preferably formed adjacent to the internal pressure sheath and has typically a volume in the range from 1 $cm^3$ to 500 $cm^3$. The internal pressure sheath serves as insulating material in the end-fitting and the local volume with the functional fluid serves to inhibit or prevent leak currents, which may cause damage to the internal pressure sheath.

To ensure that the functional fluid fills out the entire of the local volume, it is preferred to inject the functional fluid under pressure and in an embodiment the functional fluid is injected into the local volume with a pressure ranging from about 0 barg to the operational pressure of the pipe.

In some instances, a flow of functional fluid is used to flush water from internal surfaces of the end-fitting. In these cases, a vacuum pump may be coupled to the volume allowing injection pressure to be below atmospheric pressure.

In some instances, the fluid removed from the volume, including spend functional fluid, is sent to a flare to neutralize the contents.

For the purpose of avoiding electrical contact between the first and the second armour layer, the invention provides an embodiment in which the local volume is placed at a position between the termination of the first armour layer and the termination of the second armour layer.

The present invention also relates to a method for reducing stray current in an end-fitting for terminating an unbonded flexible pipe comprising a first and a second armour layer co-axially arranged, and an electric heating system, said end-fitting comprises means for mechanically anchoring the first armour layer to the end-fitting and comprises electrical connections for connecting the first armour layer to a power-source, said end-fitting comprises means for mechanically anchoring the second armour layer to the end-fitting, the first and the second armour layers being electrically insulated from each other by at least one electrically insulating layer, said end-fitting comprises a local volume adjacent to the electrically insulating layer, said method comprises the step of injecting a functional fluid into the local volume.

According to the method, the functional fluid is selected from the group consisting of electrically insulating fluid or moisture absorbing fluid or transformer oil.

In an embodiment, the functional fluid is a gas, such as $SF_6$ (sulfurhexaflouride) or Freon 12.

For the purpose of maintaining a sufficient amount of functional fluid in the local volume, the functional fluid is injected into the local volume batch-wise. The period between each injection may be determined by the specific use and location of the end-fitting.

In another embodiment, the functional fluid is injected continuously into the local volume. In this way, the pressure in the internal volume is maintained even-though it is leaking fluid to the ambient or to the bore of the pipe.

In an embodiment, the functional fluid is injected through one channel and siphoned away from another channel, hereby ensuring that the functional fluid removes unwanted species diffusing into the local volume and optionally the internal volume of the end-fitting.

In an embodiment, an exit channel of the local volume is fitted with a vacuum pump. In this way, pressure can be reduced in the local volume, hereby further promoting removal of unwanted species with low vapour pressure.

DETAILED DESCRIPTION OF THE INVENTION

The invention will now be described in further details with reference to embodiments shown in the drawing in which.

The figures are not accurate in every detail but only sketches intended to show the principles of the invention. Details which are not a part of the invention may have been omitted. In the figures, the same reference signs are used for the same parts.

Figure 1:
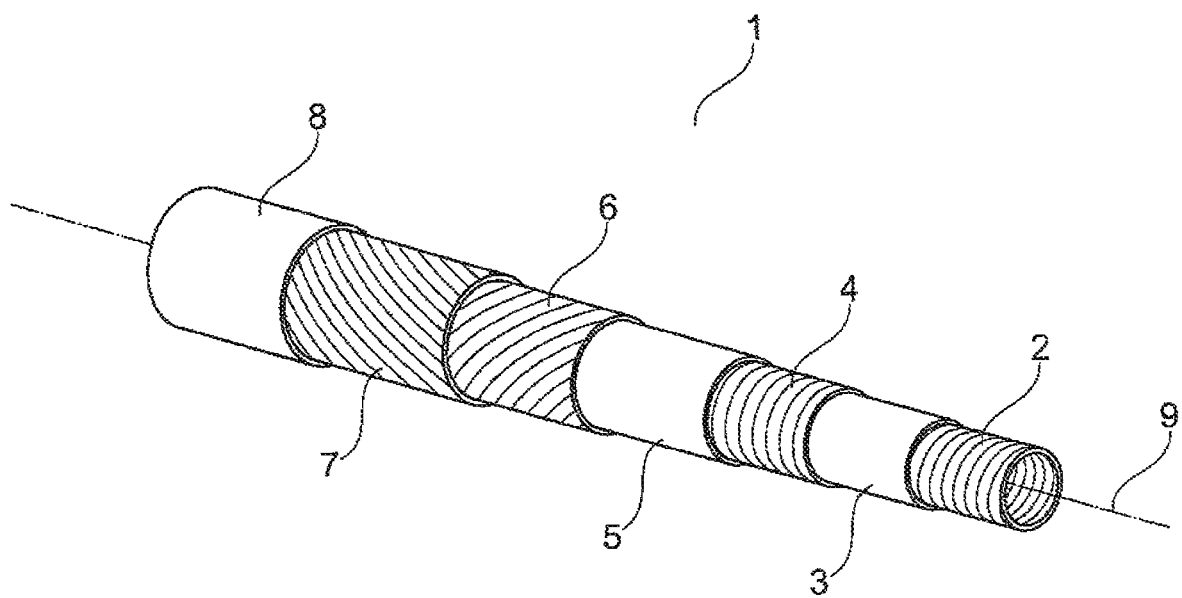
FIG. 1 shows an unbonded flexible pipe for use with the end-fitting according to the invention.

FIG. 1 shows an unbonded flexible pipe 1. The pipe 1 comprises a carcass 2 which constitutes an inner armour layer inside the internal pressure sheath 3, which is fluid tight. On the outer surface of the internal pressure sheath 3, is found a pressure armour 4 which surround and protect the internal pressure sheath. In this particular embodiment, the pressure armour is surrounded by an electrical insulating layer 5. However, in other embodiments the electrical insulating layer 5 may be omitted. Around the electrical insulating layer 5 are wound two tensile armour layers 6 and 7. The tensile armour layers 6 and 7 are surrounded by an outer sheath 8.

The internal pressure sheath 3 defines the bore of the pipe with the axis 9 defined by the longitudinal direction of the pipe. The internal pressure sheath 3 is an extruded layer made from a polyethylene (PE) or a polyvinylidene fluoride (PVDF) material. The insulating layer 5 is also a fluid-impervious layer made from polyethylene (PE) or polyvinylidene fluoride (PVDF) material. The outer sheath 8 is a fluid-impervious layer, which should protect the pipe from e.g. ingress of water into the armour layers. The outer sheath is made from polyethylene (PE) or polypropylene (PP).

The carcass 2, the pressure armour 4 and the tensile armour layers 6, 7 are made from a metallic material which is electrically conductive, such as stainless steel. The metallic material is provided as strips and shaped with profiles. The strips are wound to form the armour layers. The strip forming the carcass 2 is wound with an angle of about 85 degrees in respect of the longitudinal axis of the pipe. The strip forming the pressure armour 4 is wound with an angle of about 88 degrees in respect of the longitudinal axis of the pipe. The strips forming the tensile armours 6, 7 are wound in opposite directions with an angle of about 55 degrees in respect of the longitudinal axis of the pipe.

Figure 2:
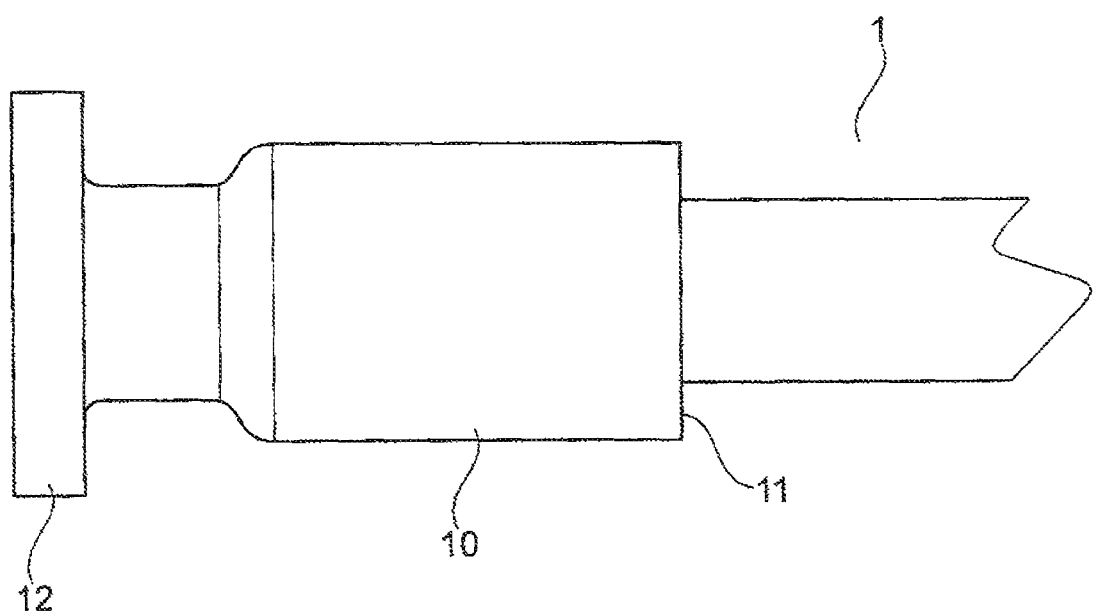
FIG. 2 shows an end-fitting according to the invention.

FIG. 2 shows an unbonded flexible pipe 1 and an end-fitting 10 forming an assembly where the unbonded flexible 1 enters the end-fitting at the front end 11 and is terminated in the end-fitting 10. At the rear end or back end 12, the end-fitting comprises a flange by which the end-fitting may be attached to a connector, thus, forming a transition between the flexible pipe and other parts in a fluid transport system.

Figure 3:
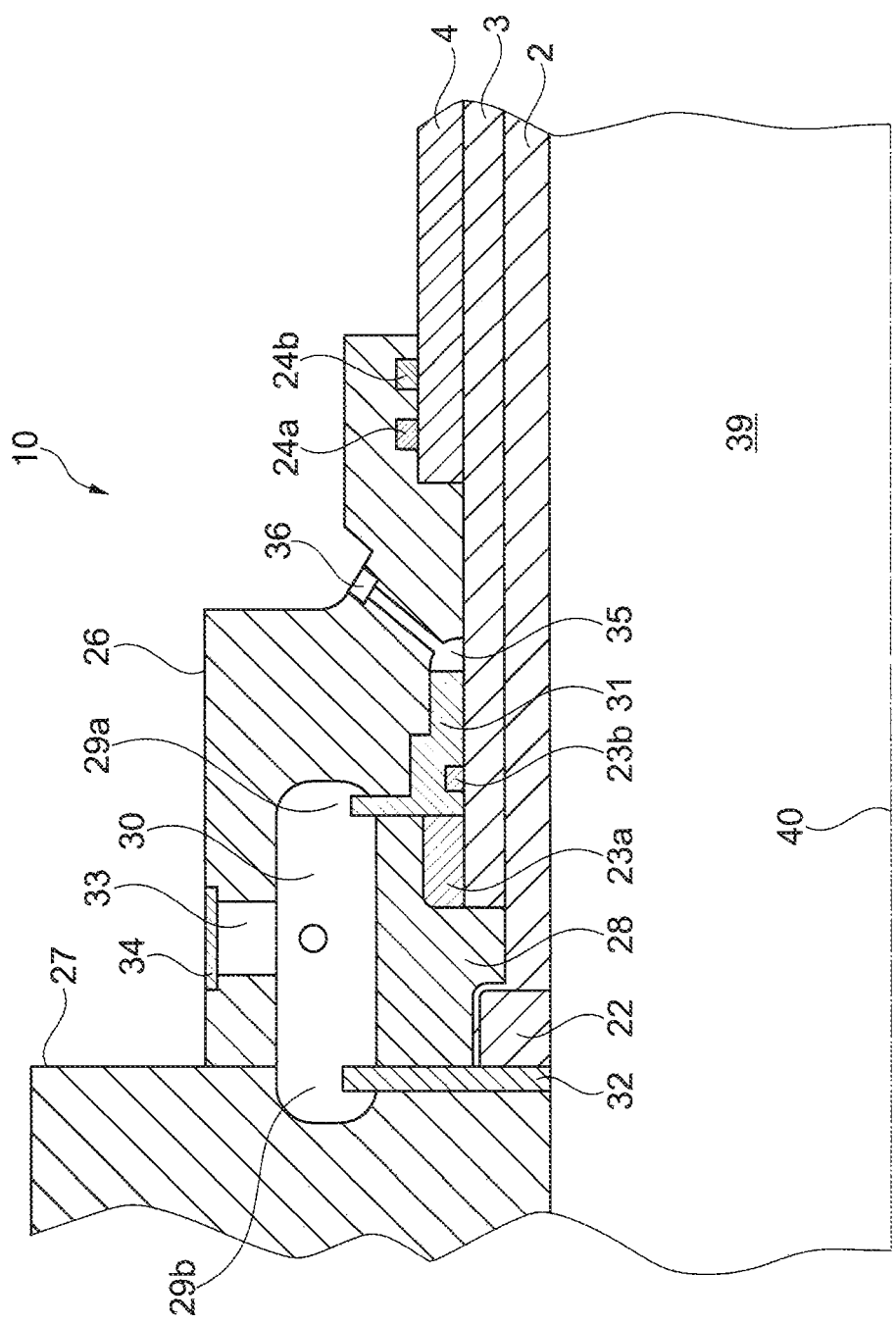
FIG. 3 shows a section of the end-fitting terminating a flexible pip.

FIG. 3 is a section of the end-fitting 10 according to the invention. FIG. 3 only shows the part of the end-fitting 10 in which the carcass 2, the internal pressure sheath 3, and the pressure amour is terminated.

The carcass 2 is terminated by the carcass ring 22 which anchor the carcass to the end-fitting. The internal pressure sheath 3 is attached to the end-fitting by ring-members 23a and 23b which squeezes on the internal pressure sheath and keep it in place. In this particular embodiment, the internal pressure sheath 3 is squeezed between the carcass 2 and the ring-members 23a and 23b. The pressure armour 4 is anchored to the end-fitting by use of bolts 24a and 24b.

The through-going opening of the end-fitting (and the bore of the pipe) is indicated by reference number 39. The dotted line 40 indicates the center axis and longitudinal direction of the through-going opening of the end-fitting.

The end-fitting comprises metallic parts 26 and 27, which are placed adjacent to each other. Both the metallic part 26 and 27 comprise a void part 29a and 29b which together with a metallic part 28 form a chamber 30 in the end-fitting 10.

The metallic part 28 is in electrically contact with the carcass 2 and insulated from the parts 26 and 27 by insulating devices 31 and 32. The metallic part 28 is further insulated from the parts 26 and 27 by means of the chamber 30 which is filled with electrically insulating oil. The chamber 30 communicates with the exterior of the end-fitting 10 via a passageway 33, which is closed with a removable closing device 34. The passageway 33 may also be filled with electrically insulating oil.

The metallic part 26 covers the internal pressure sheath 3 and the pressure armour 4. Adjacent to the internal pressure sheath 3 and the insulating device 31, the metallic part 26 comprises a void which forms a local volume 35 in the end-fitting. The local volume communicates with the exterior of the end-fitting 10 via a channel 36. The channel 36 is at its upper end adapted for connection to a tube or the like (not shown). The tube may supply functional fluid to the local volume 35. Alternatively, the tube may be used to remove functional fluid from the local volume 35.

The metallic part 26 may comprise several channels 36 in its circumference. The local volume 35, however, will run continuously in a circular path along the inner perimeter of the metallic part 26. The channels 36 may in turn be used for supplying functional fluid and removing functional fluid.

The carcass 2 and the pressure armour 4 are connected to an electric power-source by wiring (not shown). When current is applied to the carcass 2 and the pressure armour 4 the electrical insulation constituted by the internal pressure sheath 3, the insulating devices 31 and 32 and the oil-filled chamber ensures that there is no electrical contact between the two electrically conductive layers 2 and 4 in the end-fitting 10. Moreover, the local volume filled with functional fluid serves to inhibit and reduce spread of leak currents and thereby the risk of detrimental arc-formation (spark-formation).

Moreover, the local volume filled with functional fluid which serves to reduce occurrence of leakage current or stray currents, thereby also reduces the risk of galvanic corrosion of the metallic material in the end-fitting.

The end-fitting shown in FIG. 3 does not comprise a tensile armour. If the end-fitting comprises a tensile armour, this tensile armour is terminated in the end-fitting in a fixation chamber provided in the end-fitting. The tensile armour is anchored in the fixation chamber by mechanical means, such as screws or bolt and/or a resin, such as epoxy.

What is claimed is:

1. An assembly comprising an end-fitting and an unbonded flexible pipe terminated in said end-fitting, said unbonded flexible pipe comprising a first armour layer and a second armour layer co-axially arranged, and an electric heating system,
    said end-fitting comprises means that is mechanically anchoring the first armour layer to the end-fitting and said electric heating system comprises electrical connections connecting the first armour layer to a power-source,
    said end-fitting is mechanically anchoring the second armour layer to the end-fitting, the first and the second armour layers being electrically insulated from each other by at least one electrically insulating layer in the end-fitting,
    wherein the end-fitting comprises a local volume that is defined by a surface of an insulating device, a surface of the end fitting and a surface of the electrically insulating layer, said local volume running continuously in a circular path surrounding a perimeter of the electrically insulating layer in the end-fitting and adjacent to the electrically insulating layer and wherein the local volume comprises a functional fluid selected from the group comprising an electrically insulating fluid, a moisture absorbing fluid and a transformer oil.

2. The assembly according to claim 1, wherein the end-fitting comprises electrical connections connecting the second armour layer to a power-source.

3. The assembly according to claim 1, wherein the end-fitting comprises electrical connections connecting the second armour layer with a source selected from the group comprising the power-source connected with the first armour layer, a different power-source and ground.

4. The assembly according to claim 1, wherein the end-fitting comprises means connecting at least one of the first or second armour layers to ground.

5. The assembly according to claim 1, wherein the local volume communicates with the exterior surface of the end-fitting via at least one channel.

6. The assembly according to claim 1, wherein the functional fluid is selected from the group comprising a liquid and an arc suppressing fluid.

7. The assembly according to claim 1, wherein the functional fluid is FS6 (sulfurhexaflouride) or a halogenated gas such as freon 12.

8. The assembly according to claim 1, wherein the first armour layer is a carcass.

9. The assembly according to claim 1, wherein the second armour layer is selected from a pressure armour, a tensile armour, and a combination of tensile armour and pressure armour.

10. The assembly according to claim 1, wherein the first and the second armour layers are separated by an internal pressure sheath, said internal pressure sheath being the electrically insulating layer.

11. The assembly according to claim 1, wherein the local volume has volume in the range of about 1 cm3 to about 500 cm3.

12. The assembly according to claim 1, wherein the functional fluid is injected into the local volume with a pressure from about 0 barg.

13. The assembly according to claim 1, wherein the electrically insulating layer is an internal pressure sheath and the local volume is placed adjacent to the internal pressure sheath.

14. The assembly according to claim 1, wherein the local volume is placed at a position between the mechanically anchoring of the first armour layer and the mechanically anchoring of the second armour layer.

15. A method for reducing stray current in an end-fitting arranged for terminating an unbonded flexible pipe comprising a first armour layer and a second armour layer co-axially arranged, and an electric heating system, said end-fitting comprises means arranged for attaching the first armour layer to the end-fitting and comprises electrical connections arranged for connecting the first armour layer to a power-source,
    said end-fitting comprises means arranged for attaching the second armour layer to the end-fitting, the first and the second armour layers being electrically insulated from each other by at least one electrically insulating layer,
    the pipe comprises a tensile armour located outside an internal pressure sheath, the tensile armour being terminated in a fixation chamber defined between an inner casing and an outer casing of the end-fitting and
    wherein said end-fitting comprises a local volume defined by a surface of an insulating device, a surface of the end fitting and a surface of the electrically insulating layer, said local volume running continuously in a circular path surrounding a perimeter of the electrically insulating layer and adjacent to the electrically insulating layer and wherein the local volume is distinct from the fixation chamber, said method comprises the step of injecting a functional fluid into the local volume, wherein the functional fluid is selected from the group comprising an electrically insulative fluid, a moisture absorbing fluid and a transformer oil.

16. The method according to claim 15, wherein the functional fluid is a gas, such as SF6 (sulfurhexaflouride) or Freon 12.

17. The method according to claim 15, wherein the functional fluid is injected into the local volume batch-wise.

18. The method according to claim 15, wherein the functional fluid is injected continuously into the local volume.

* * * * *

UNITED STATES PATENT AND TRADEMARK OFFICE
CERTIFICATE OF CORRECTION

PATENT NO. : 11,187,359 B2
APPLICATION NO. : 16/077225
DATED : November 30, 2021
INVENTOR(S) : Kristian Glejbol It is certified that error appears in the above-identified patent and that said Letters Patent is hereby corrected as shown below:

On the Title Page

Item (71) Applicant, "National Oilwell Vareo Denmark I/S" should read -- National Oilwell Varco Denmark I/S --.

Signed and Sealed this
Twenty-fourth Day of January, 2023

Katherine Kelly Vidal
*Director of the United States Patent and Trademark Office*